Figure 1:
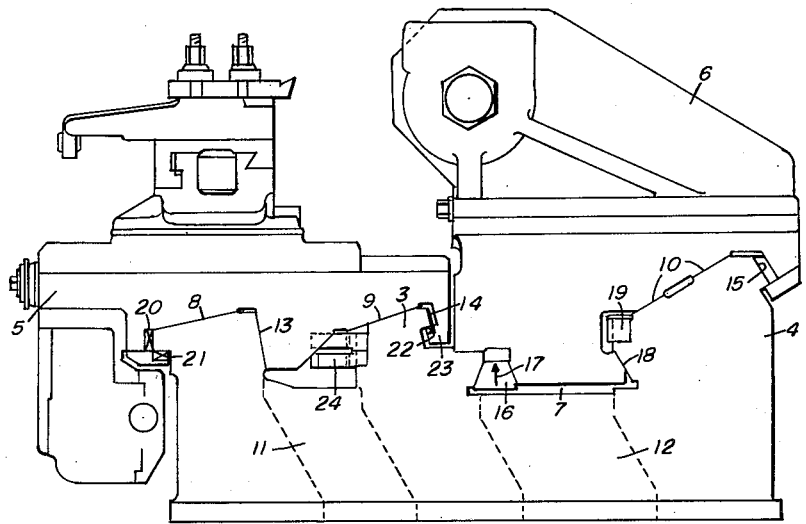

Dec. 5, 1961   O. WALDRICH   3,011,373
MACHINE TOOLS
Filed April 22, 1953

INVENTOR
OSKAR WALDRICH

BY
ATTORNEYS

United States Patent Office 3,011,373
Patented Dec. 5, 1961

3,011,373
MACHINE TOOLS
Oskar Waldrich, Werthenbach, Kreis Siegen, Germany
Filed Apr. 22, 1953, Ser. No. 350,370
Claims priority, application Germany Apr. 29, 1952
3 Claims. (Cl. 82—32)

This invention relates to the guiding surfaces for the carriage and tailstock or the like of a machine tool. Beds for lathes and grinding machines have as a rule been constructed with a plurality of longitudinal guides on the upper surface of the bed for the carriage and tailstock, upon which the carriage and tailstock rest from above. Where importance is attached to allowing the carriage to move past the tailstock, as a rule four guides are provided of which the front two serve for the carriage and the rear two for the tailstock. A disadvantage of this construction is that in some circumstances the resultant forces tend to lift the carriage or the like from the guides, as for example when heavy cuts are being taken and the cutting forces are high in relation to the weight of the carriage.

According to the present invention all the guiding surfaces are so inclined that the resultant forces even under changing conditions of operation are always applied towards the guiding surfaces i.e. in such a way that there is no force tending to lift the carriage and tailstock or the like from any of the said guiding surfaces. This arrangement not not avoids any tendency to lift the carriage or the like but it increases the stiffness of guiding or securing of the carriage or the like. The invention further enables the parts provided for guiding and notwithstanding the forces to be particularly well-protected from damage by chips. Further, in the arrangement according to the invention the tailstock may be guided substantially only by the rearmost guide and be clamped thereto from the front and back and not as hitherto in the vertical direction. This new method of clamping, in which the direction of the clamping forces is very much in the same direction as the forces exerted by the workpiece on the tailstock during machining, results in a particularly stiff securing of the tailstock on the bed, which is thus pressed more firmly against the bed by the working loads so far as the bearing surfaces of the rear guide are correctly disposed.

According to the invention, this is effected by the provision of a main guiding surface which in comparison with the other guiding surfaces is of considerable breadth and is so inclined that it is substantially perpendicular to the resultant force under average conditions. In the particular case of a lathe with three longitudinal guide assemblies the carriage runs on guiding surfaces inclined to the horizontal, belonging to the front and intermediate assemblies, while the tailstock is guided by means of an inverted guide of the intermediate assembly, and by an inclined guiding surface of the rear assembly, and is clamped between these two assemblies. It is desirable that one guiding surface of each of the three assemblies is downwardly inclined towards the front and a rear surface of each is at an angle of about 90° to the said downwardly inclined surface, so that the clamping forces are not horizontal but are more nearly in the direction of the resultant force which acts from the workpiece on the tailstock.

The advantage of such a construction is readily understood; the carriage is satisfactorily and rigidly constrained because it rests on two guides. But the tailstock also is given increased stiffness in clamping, because as well as being guided by the last-mentioned guide it is also guided by the rear edge of the intermediate assembly and is clamped in a novel fashion.

The inclination of the surfaces of the guides, in addition to that described, also has the advantage that chips do not rest on the guide surfaces and the surfaces are thus saved from wear. The chips can be removed through out-flow shafts of adequate dimensions, in themselves known.

The inclined arrangement of the surfaces also has the advantage as regards the guiding of the carriage that on the under edge of the front guide a retaining device can be provided, for example a double wedge strip or the like, and the carriage thus through the inclined arrangement of the surfaces be drawn reliably against both inclined surfaces without auxiliary means. With suitable machining, this applies both to the front and to the intermediate assembly.

In further development of the invention, the rear surface of the front assembly which as above described, is inclined and therefore more nearly directly faces the spindle axis, is made broad so that the tool pressure can be taken fully on this surface. In this way the load on the surface is reduced and the bed more advantageously stressed. In addition, only slight pressure by the above mentioned wedge strip is necessary, because the tool pressure itself presses the carriage against the bed.

It is also desirable to provide a groove at the lower end of the rear surface of the intermediate assembly, in which is accommodated a hook-like projection on the carriage. In this way, tipping of the carriage backwards is prevented. A retaining device, as for example a wedge strip, can be provided here, which draws the carriage firmly downwards. The same result can be obtained, however, without a clamping device, if the bearing surface in the groove is arranged in such relationship to the upper surface of the intermediate wall that a wedge effect is obtained. In this case, by the drawing effect of the wedge on the front guide surface, a retaining effect is simultaneously obtained on the intermediate guide. By such an arrangement, the result is also obtained that there is clearance between the carriage and the bed on the upper part of the rear surface of the intermediate guide, a surface on which hitherto the main guiding was effected and which had therefore to be particularly well finished, but was particularly exposed to damage through the action of chips.

Finally, the arrangement according to the invention makes it possible to provide the rack and pinion mechanism for the movement of the carriage and the tailstock along the bed at the front surface and to the rear respectively of the intermediate guide assembly, on vertical surfaces. This arrangement has the advantage on one hand that chips cannot adhere at these places and on the other hand that the forces are applied centrally and neither part during its movement tends to skew.

The arrangement according to the invention of the guiding and clamping surfaces also has the advantage that as wear occurs the carriage and the tailstock automatically adjust themselves without play, by sinking.

The invention can also be applied to machine tools other than lathes and grinding machines, as for example planing machines. It can also be used in lathes for other than bed surfaces, for example for the guide surfaces between the tool-holder and the cross-slide, these surfaces then having a similar form to that above described for the bed of the lathe.

In the accompanying drawings, FIGURE 1 shows by way of example a lathe according to the invention in cross-section.

Figure 2:
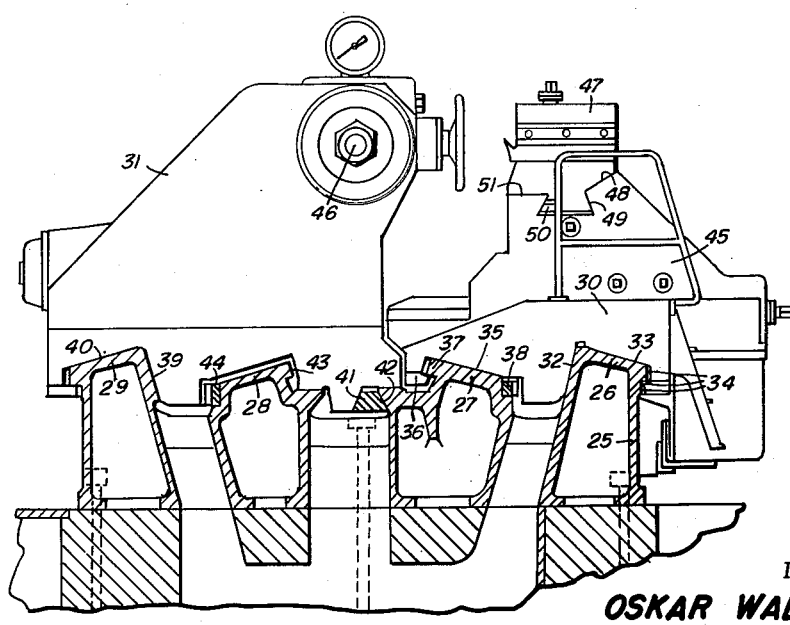

FIGURE 2 is a cross-section of a heavy roll-turning lathe having a somewhat modified construction.

Referring now to FIGURE 1, the tailstock 6 is guided in the inverted dovetail guideway 7 between a central or intermediate wall 3 and a rear wall 4, as well as on the rear wall 4. The surfaces 8 of a front wall 2, 9 of the middle wall 3 and 10 of the rear wall 4 are inclined downwards forwardly, so that the turnings or chips can flow directly away into the discharge shafts 11 and 12 shown in dotted lines and do not remain adhering to the guideways. The rear surface 13 of the front wall 2 and the rear surface 14 of the intermediate wall 3 and 15 of the rear wall 4 are also inclined, but downwardly to the rear and at an angle of about 90° to the respective surfaces 8, 9 and 10. Here also, therefore, the turnings cannot adhere. The rear surface 13 of the front wall 2 is made wide and can withstand the whole tool pressure. The top surface 10 of the rear wall 4 is also made very broad and can without difficulty withstand the tool pressure. The inverted dovetail groove and the inclined upper surface 10 are enough to ensure that the tailstock is reliably and stiffly supported. The stiffness of the mounting is enhanced by a wide strip 16 carried by the tailstock which is drawn up in the direction of the arrow 17. This causes the tailstock to bear firmly against the surface 18 of the dovetail groove on the front of the rear wall 4 and at the same time presses the corresponding guide surface of the tailstock firmly against the surface 10 of the rear wall 4. Between the two surfaces 18 and 10 of the rear wall 4 is mounted the rack 19 for the movement of the tailstock along the bed.

A firm seating of the carriage 5 is ensured by a double wedge strip 20 which stands vertically and a further hardened guide strip 21 beneath the wedge strip. By these means the carriage is drawn firmly against the rear surface 13. At the same time a wedge strip 22 on a hook-like projection 23 of the carriage 5 is drawn against a counter surface and the carriage thus drawn equally firmly against the guide surface 9 of the intermediate wall 3. The rack and pinion motion for moving the carriage is in front of the intermediate wall 3 at 24, so that skewing of the carriage is not to be feared.

In the lathe according to FIGURE 2, the arrangement of the bed, the tailstock and the carriage is somewhat modified as compared with that shown in FIGURE 1 but in essence is similar. Here the bed 25 has four walls with guideways 26, 27, 28 and 29, of which the first two, 26 and 27, support the carriage 30 and the last two, 28 and 29, support the tailstock 31. The wall 26 has a main guiding surface 32 and the carriage 30 merely rests on the further guide surface 33 of the wall 26. No working forces are transmitted here. At 34 there is clearance between the carriage and the guide wall. The wall 27 has a bearing surface 35 which is also free from working loads and the carriage has a hook-shaped projection 36 which engages in a corresponding rib 37 on the wall 27. The movement of the carriage is effected by the aid of a rack 38 more or less vertically above which lies the centre of gravity of the carriage, so that canting is not to be feared. The tailstock 31 lies over a main guiding surface 39 on the guide wall 29, while the guide surface 40 is only loaded by weight. Clamping is effected by means of a wedge strip 41 which engages under a corresponding counter-surface 27 and corresponds to a counter-wedge surface 43 on the wall 28. Movement of the tailstock is effected by the aid of a rack 44.

On the carriage 30 a cross-slide 45 is movable transversely in relation to the spindle axis 46. A tool-holder 47 is arranged longitudinally slidable on the cross-slide. The guiding of the tool-holder in the cross-slide is effected by a main guiding surface 48 which is larger than the other surfaces serving for guiding and is substantially more or less perpendicular to the main load coming on the tool-holder. The guiding surfaces 49 form a dovetail section and serve for clamping the tool-holder by means of a wedge strip 50, while a guide surface 51 serves solely as a supporting surface.

I claim:
1. In a machine tool of the type including a generally horizontal bed and movable machine parts such as a carriage and a tailstock slidingly supported on the bed for non-interfering motions along the bed to cooperate with a workpiece supported on an axis above the central portion of the bed, the improvement which comprises at least three longitudinally parallel and horizontal bearing ways carried by the bed for slidingly supporting said parts, certain of the ways lying on opposite sides of a vertical plane containing said axis, and at least the outermost of said ways each comprising a pair of longitudinal bearing faces approximately perpendicular to one another as viewed in a section taken perpendicular to said axis, and of which one face is more sharply inclined to the vertical than the other face; the more sharply inclined face of each of said outermost ways facing generally towards the other way and being substantially perpendicular to the direction of the resultant force upon the corresponding machine part during operation of the tool, and the less sharply inclined face being substantially broader in face width than the more sharply inclined face; whereby the way surfaces provide pressure-bearing areas tending to resist movements of the machine parts away from the direction of load application.

2. A machine tool in accordance with claim 1, in which the outermost way to one side of said vertical plane has an additional abutment face opposite to the more sharply inclined face of said way, for cooperation with clamping means on one of said machine parts.

3. A machine tool in accordance with claim 1, in which at least one of said ways other than an outermost way comprises an undercut bearing surface adapted to receive a hook-like projection on the corresponding machine part.

References Cited in the file of this patent

UNITED STATES PATENTS

| 356,678 | Brewis | Jan. 25, 1887 |
| 707,155 | Osgood | Aug. 19, 1902 |
| 723,704 | Montstream | Mar. 24, 1903 |
| 1,315,917 | Eriksson | Sept. 9, 1919 |
| 1,328,962 | Overgaard | Jan. 27, 1920 |
| 1,361,792 | Groene | Dec. 7, 1920 |
| 1,408,305 | Maynard | Feb. 28, 1922 |
| 1,523,310 | Sundstrand | Jan. 13, 1925 |
| 1,528,971 | Groene | Mar. 10, 1925 |
| 2,082,734 | Griffing et al. | June 1, 1937 |
| 2,092,587 | Olson | Sept. 7, 1937 |
| 2,132,924 | Belden | Oct. 11, 1938 |
| 2,546,687 | Brandenburg | Mar. 27, 1951 |

FOREIGN PATENTS

| 16,405 | Great Britain | Aug. 15, 1901 |
| 92,826 | Germany | July 20, 1897 |
| 362,526 | Germany | Oct. 28, 1922 |
| 383,606 | France | Mar. 13, 1908 |
| 427,023 | Germany | Mar. 24, 1926 |